United States Patent [19]

Hayes

[11] Patent Number: 5,435,339
[45] Date of Patent: Jul. 25, 1995

[54] MANUAL AIR RELIEF VALVE

[75] Inventor: Joseph E. Hayes, Shelby, Mich.

[73] Assignee: KDI American Products Company, Moorpark, Calif.

[21] Appl. No.: 45,013

[22] Filed: Apr. 7, 1993

[51] Int. Cl.6 ........................................... F16K 17/168
[52] U.S. Cl. .................................... 137/315; 137/557; 251/95; 251/104; 251/107; 251/215; 251/252; 251/288
[58] Field of Search .................. 251/95, 110, 215, 251, 251/252, 297, 342, 347, 349, 351, 103, 104, 107, 108; 137/557, 315; 4/488, 506

[56] References Cited

U.S. PATENT DOCUMENTS

| 168,657 | 10/1875 | McLaughlin | 251/252 |
| 1,597,794 | 8/1926 | Horsbaugh | 251/252 |
| 2,723,829 | 11/1955 | Anderson | 251/100 |
| 3,062,496 | 11/1962 | Stehlin | 251/324 |
| 3,134,401 | 5/1964 | Kelly et al. | 137/557 |
| 3,272,230 | 9/1966 | Bolling | 137/557 |
| 3,434,694 | 3/1969 | Skinner | 251/215 |
| 3,826,467 | 7/1974 | Hart et al. | 251/98 |
| 4,293,117 | 10/1981 | Mueller | 251/252 |
| 4,666,124 | 5/1987 | Giacobbi | 251/252 |
| 5,005,805 | 4/1991 | Morris et al. | 251/252 |
| 5,064,168 | 11/1991 | Raines et al. | 251/324 |

FOREIGN PATENT DOCUMENTS

| 2701194 | 3/1978 | Germany | 251/252 |
| 26544 | of 1910 | United Kingdom | 251/252 |

Primary Examiner—George L. Walton
Attorney, Agent, or Firm—Noel F. Heal

[57] ABSTRACT

A manually operable pressure relief valve for swimming pool filter systems and the like, including a valve housing, a valve stem movable axially in the housing to open and close the valve, and a top cover that serves as an operating handle. The valve housing and the valve stem have components that cooperate to provide an axial movement from closed to fully open with only a quarter turn of the stem, and to prevent inadvertent removal of the stem from the housing. The stem must be moved deliberately through a sequence of required rotational and axial displacements to remove it. The top cover must also be manipulated in a prescribed manner to effect removal of the stem from the housing.

10 Claims, 4 Drawing Sheets

MANUAL AIR RELIEF VALVE

BACKGROUND OF THE INVENTION

This invention relates generally to manual pressure relief valves and, more particularly, to manual pressure relief valves used in swimming pool filter systems. A pool filter tank is basically a pressure vessel, designed to operate safely over a selected pressure range. Water and compressed air tend to accumulate in the filter tank, and an automatic pressure relief valve is sometimes provided to bleed off compressed air above a selected pressure. Compressed air in a swimming pool filter presents a potential safety hazard. Typically, the pool filter is assembled as two halves clamped together. Compressed air in the filter tank can cause violent separation of the filter halves if they are not properly clamped together or are disassembled when there is pressure in the tank.

Filter tanks are usually provided with a manual air relief valve. Before servicing the filter, maintenance personnel must first open the manual valve, to vent any compressed air in the tank, or to facilitate drainage of the tank. Prior to the present invention, an air relief valve for a swimming pool filter took the form of a petcock, comprising a valve body with an internal valve seat, and a threaded stem with a seal at its end. In its closed position, the stem is engaged in the housing and tightened down, with the valve seal engaging the valve seat. To bleed off the compressed air, the valve stem is unscrewed to lift the seal from the valve seat. The petcock has two significant drawbacks. First, the stem can be unscrewed to the point at which it falls out of the valve housing, and it must be located and replaced before the filter can be operated again. Second, the rate at which air is bled off through the petcock depends on the degree to which the stem is unscrewed. If the petcock is opened only a turn or two, the compressed air will bleed off relatively slowly, and, after a given time, the air pressure in the tank will be higher than if the petcock were opened further. To vent the tank quickly, one usually opens the petcock as far as possible without having it fall out.

It will be appreciated from the foregoing that there is a need for an improved manual air relief valve that avoids the difficulties of the prior art, and provides a more reliable means for venting pool filters and the like. The present invention satisfies this need.

SUMMARY OF THE INVENTION

The present invention resides in a manual relief valve structure for use in venting a swimming pool filter tank, or other similar pressure vessel. Briefly, the valve of the invention comprises a valve housing with an inlet port connected to a pressure vessel, an outlet port for venting fluid from the pressure vessel, and a valve seat; a valve stem, having a seal for engaging the valve seat in a closed position; means for opening and closing the valve completely in less that a full turn of the valve stem, including at least one pin on the valve stem cooperating with a camming slot in the valve housing; and means for preventing inadvertent removal of the valve stem from the valve housing. By means of the invention, the pressure vessel can be vented safely and reliably without risk of losing a valve component.

In the disclosed embodiment of the invention, there are two camming slots, each of which includes a steeply sloping portion to effect rapid opening and closing of the valve, and detent means at each end of the steeply sloping portion, to retain the stem in a selected open or closed position. The detent means includes a slot portion of different slope from the steeply sloping portion. More specifically, the detent means is a short section of the slot that is purely circumferential, i.e. not sloping.

The means for preventing inadvertent removal of the valve stem from the valve housing includes an extended portion of the slot, which can only be reached by applying a requisite force to the stem in specific direction, such as axially. The extended portion of the slot is separated from the steeply sloping portion by a constriction in the slot width, and the stem must be moved axially through the width constriction by applying the requisite force. The extended portion of the slot includes a vertical section, i.e. parallel to the axial direction, requiring that the stem be further inserted axially into the housing, a subsequent "horizontal" or purely circumferential section, requiring that the stem next be rotated, and another vertical section, requiring that the stem next be withdrawn axially from the housing.

The means for preventing inadvertent removal of the stem from the housing further includes means attached to the valve stem, for engaging a portion of the valve housing to restrict axial movement of the stem with respect to the housing. The means attached to the valve stem is manually movable to remove the restriction in axial movement of the stem. In the disclosed embodiment, the means attached to the valve stem is part of an operating handle and includes at least one bendable tab for engaging a flange on the valve stem, wherein the bendable tab my be positioned to disengage from the flange and permit axial removal of the stem from the housing.

The disclosed embodiment of the invention also includes means for attaching a pressure gauge to the valve.

It will be appreciated from the foregoing that the present invention represents a significant advance in manually operated pressure relief valves. In particular, the invention provides a valve that is easy to open and close fully with only a quarter turn of its stem, yet the stem cannot be inadvertently removed. Moreover, the valve has a self-cleaning action and is adapted to receive an optional pressure gauge. Other aspects and advantages of the invention will become apparent from the following more detailed description.

DESCRIPTION OF THE PREFERRED EMBODIMENT

Figure 1:
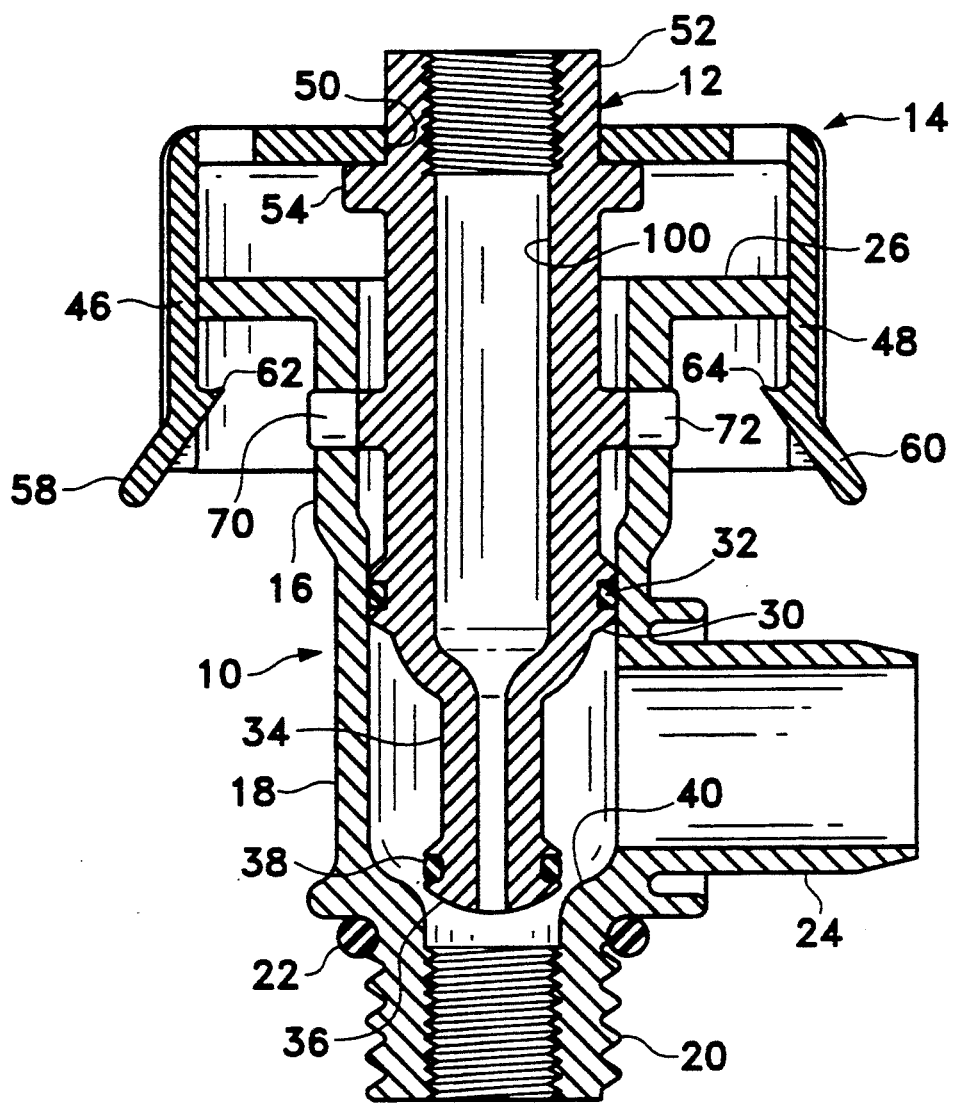
FIG. 1 is an elevational view, partly in cross section, of the manual air relief valve of the invention.
Figure 2:
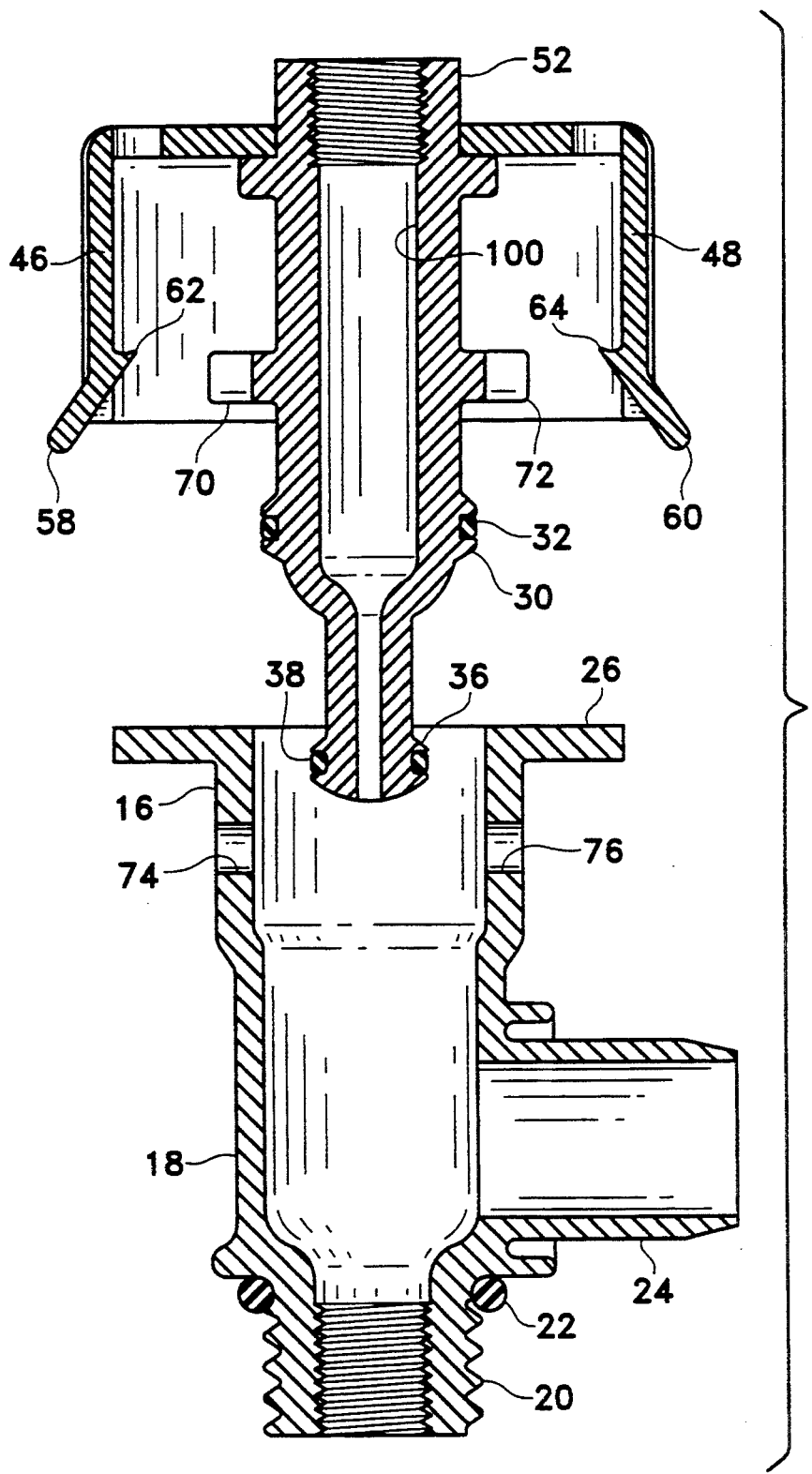
FIG. 2 is an exploded view similar to FIG. 1, with the valve body separated from the remaining components of the valve.

As shown in the drawings for purposes of illustration, the present invention is concerned with a manual air relief valve. In accordance with the invention, the valve avoids the disadvantages of petcocks by providing a safe and reliable device that is easy to open fully and has a valve stem that cannot be accidentally removed. Further, the valve of the invention provides a reliable radial sealing action, is self cleaning, and may be fitted with a pressure gauge.

The principal components of the valve, as illustrated in FIGS. 1, 2 and 3A–3C, are a valve body 10, a valve step 12 and a top cover 14. The valve body 10 has a hollow, generally cylindrical upper portion 16 and an integral, hollow, generally cylindrical lower portion 18. It will be understood, of course, that the terms "upper" and "lower" are used only with reference to orientation of the drawings and do not imply any restriction as to the orientation of the actual device. The lower portion 18 terminates in a nipple 20 of reduced diameter, having both internal and external threads for engagement with two different types of filter tanks (not shown). An annular seal 22 seals the valve housing in engagement with the filter tank.

Also integral with the lower portion 18 of the valve housing 10 is an nonthreaded nipple 24 forming an exit port for the valve and extending generally perpendicularly with respect to the longitudinal axis of the valve housing. The upper end of the valve housing 10 terminates in an integral external flange 26, the purpose of which will become apparent as the description proceeds.

The valve stem 12 is also generally cylindrical in shape and, when assembled with the valve housing 10, the stem extends down into the interior of the housing. The stem 12 is for the most part much smaller in diameter than the inside diameter, but includes a grooved annular rib 30 in which is fitted an annular seal 32. The seal 32 engages the inside surface of the lower portion 18 of the valve housing and prevents water or air from rising above that point in the housing. The stem also includes a reduced-diameter lower portion 34, terminating in a bulbous end 36 in which is fitted another annular seal 38. When the valve is in a closed position, the annular seal 38 engages a tapered valve seat 40 at the bottom of the housing 10.

Figure 3A:
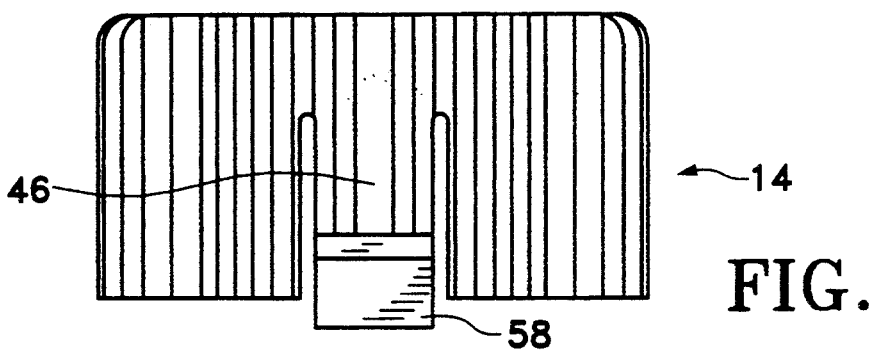
FIG. 3A is an elevational view of a valve cap that forms part of the valve.
Figure 3B:
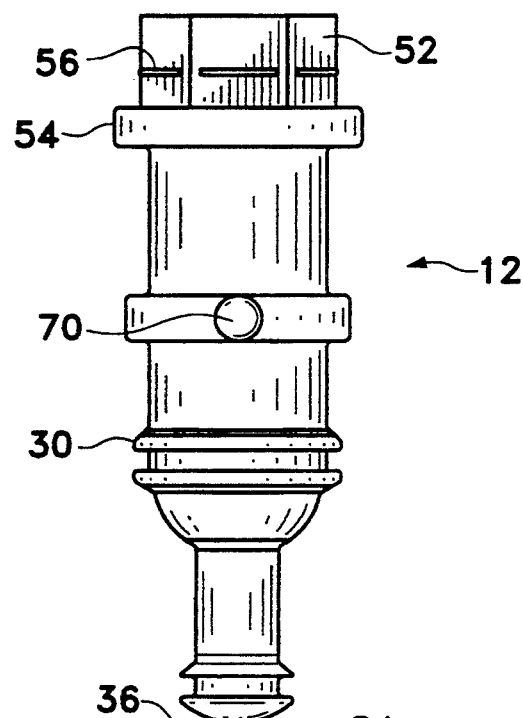
FIG. 3B is an elevational view of a valve stem that forms part of the valve.
Figure 3C:
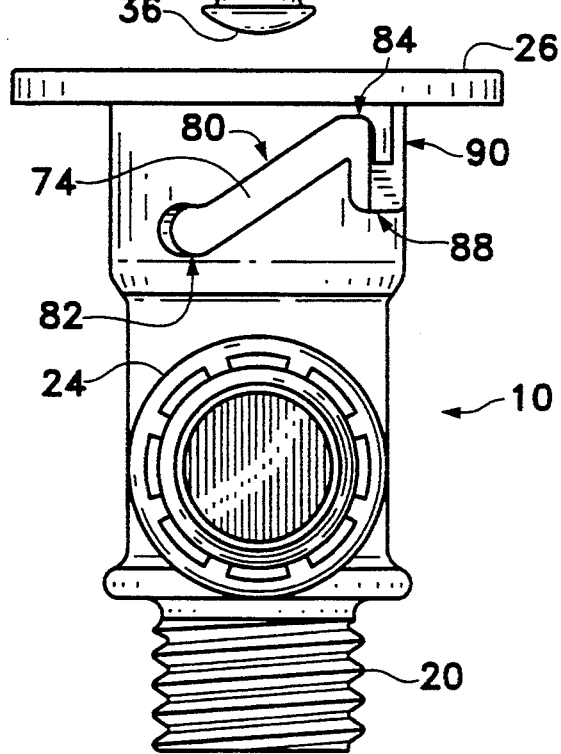
FIG. 3C is an elevational view of the valve body.

The top cover 14 of the valve performs two principal functions. It is firmly attached to the stem 12 and therefore provides an operating handle of relatively large diameter, and it includes two locking tabs 46 and 48 that help prevent accidental removal of the stem 12 and the cover 14. The top cover 14 is basically the shape of an inverted cup, as viewed in the drawings. It has a central hexagonal opening 50 that engages a hexagonal upper end portion 52 of the valve stem 12. An external flange 54 on the stem 12, and external ribs 56 (shown in FIG. 3B, prevent inadvertent disassembly of the cover 14 from the valve stem 12. The locking tabs 46 and 48 are integral with the cylindrical wall of the cover and extend downward longitudinally. The tabs are each formed by longitudinal slits, as best seen in FIG. 3A. The tabs are diametrically opposite each other and terminate in outwardly sloping portions 58 and 60, each of which presents a locking shoulder, 62 and 64, respectively, inwardly beneath the flange 26 on the valve housing. The internal diameter of the top cover is sufficiently large to clear the external flange 26, but the locking shoulders 62 and 64 prevent accidental removal of the cover 14 (and with it the valve stem 12) from the housing 10. Removal has to be effected by manually bending the tabs 46 and 48 out from under the flange 26 and simultaneously withdrawing the cover 14 and the stem 12 from the housing 10. However, the outwardly sloping portions 58 and 60 of the tabs 46 and 48 permit the cover 14 (and with it the valve stem 12) to be easily assembled with the valve housing 10.

An important aspect of the invention is the nature of the mechanism that permits the valve to be opened and closed, and provides another means for preventing accidental removal of the stem from the housing. This mechanism includes two diametrically opposed pins 70 and 72 formed integrally with extending out from the valve stem 12. When the stem is in an operative position with respect to the housing, these pins 70 and 72 engage diametrically opposed slots 74 and 76 in the wall of the upper cylindrical portion 16 of the housing 10. The shape and purpose of the slots 74 and 76 can best be appreciated from FIG. 3C and the enlarge view of one of the slots in FIG. 4.

Figure 4:
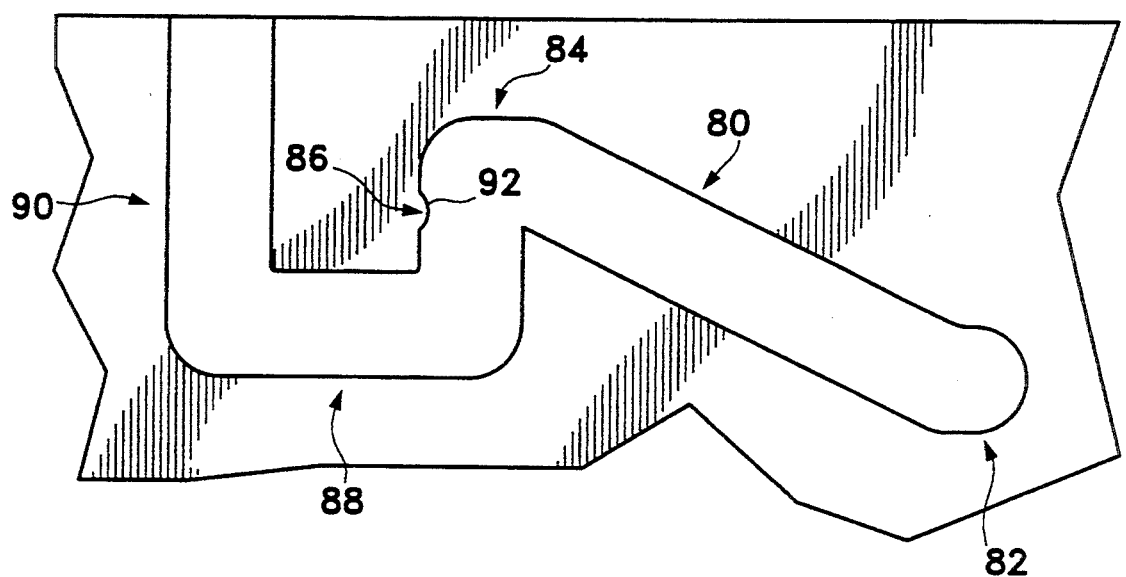
FIG. 4 is an enlarged, fragmentary view of one of two irregularly shaped slots in the valve housing.

As shown in FIG. 4, the slot is of substantially uniform width, to accommodate one of the pins 70, 72 in a relatively loose fit. The slot includes a sloping portion 80 terminating at its lower end in a short section 82 having a different slope from that of the sloping portion 80. At the upper end of the sloping portion 80, them is another short section 84 of different slope, merging with a downwardly directed vertical section 86. The latter, in turn, merges with a substantially horizontal section 88, which merges with an upwardly directed vertical section 90.

When the cover 14 is rotated clockwise, the pins 70 and 72 move down the sloping portions 80 of the slots and the valve stem moves to a closed position, with the annular seal 38 engaging the valve seat 40 in predominantly radial contact. The pins in the closed position rest in the short portions 82 of the slots, which effectively form a detent mechanism to keep the valve closed until the cover and stem are torqued in a counter-clockwise direction. Opening the valve requires only a quarter turn (90 degrees) of the valve stem 12. Thus the valve can be fully opened very quickly and reliably. In the open position, the pins 70 and 72 rest in the other short portions 84, which also act as a detent mechanism, keeping the valve open until a requisite clockwise torque is applied to the cover 14.

Removal of the stem 12 from the housing 10 requires a deliberate sequence of rotational and axial movements of the stem. First, from the open position the stem must be pressed downward axially, and with some force to move the pins past a narrowed portion of the slot formed by an inwardly facing rib 92 in the vertical portion 86. The pins may then enter the horizontal portions 88 and the vertical portions 90 of the slots, requiring that the stem be rotated further counter-clockwise, and then withdrawn upward from the housing. The vertical portions 90 of the slots may take the form of channels rather than slots, to add strength to the housing 10, which would otherwise be weakened by the presence of the two open slots extending almost the full circumference of the housing. Of course, the stem cannot be completely withdrawn from the housing until the tabs are manually moved outward to clear the external flange 26 on the housing. Normally, the valve would be disassembled in this manner only for cleaning and repair, such is for replacement of the valve seals.

The valve stem 12 has an internal bore 100, an upper portion of which is internally threaded to accommodate an optional pressure gauge (not shown). If no pressure gauge is installed, the bore is closed with a threaded plug (not shown). With the pressure gauge installed, service personnel may obtain an indication of the pressure in the filter tank.

When the valve is opened compressed air, and with it a quantity of water, pass through the valve and have a self-cleaning effect on the valve's sealing surfaces.

It will be appreciated from the foregoing that the present invention represents a significant advance in the field of manually operated pressure relief valves. In particular the invention provides a reliable and safe valve that can be fully opened in just a quarter turn of the valve stem, but which cannot be accidentally disassembled. It will also be appreciated that, although a specific embodiment of the valve has been disclosed way of example, various modifications may be made without departing from the spirit and scope of the invention. Accordingly, the invention is not to be limited except as by the appended claims.

I claim:

1. A pressure relief valve, comprising:
   a valve housing with an inlet port connected to a pressure vessel, an outlet port for venting fluid from the pressure vessel, and a valve seat;
   a valve stem, having a seal for engaging the valve seat in a closed position;
   means for opening and closing the valve completely in less that a full turn of the valve stem, including at least one pin on the valve stem cooperating with a camming slot in the valve housing; wherein the camming slot includes a steeply sloping portion to effect rapid opening and closing of the valve, and detent means in the form of a portion of different slope at each end of the steeply sloping portion, to retain the stem in a selected open or closed position; and
   means for preventing inadvertent removal of the valve stem from the valve housing:
   whereby the pressure vessel can be vented reliably without risk of losing a valve component;
   and wherein the means for preventing inadvertent removal of the valve stem from the valve housing includes au extended portion of the slot, which can only be reached by applying a requisite force to the stem in a specific direction, wherein the extended portion of the slot is separated from the steeply sloping portion by a constriction in the slot width.

2. A pressure relief valve as defined in claim 1, wherein:
   the extended portion of the slot includes a vertical section, requiring that the stem be further inserted axially into the housing, a subsequent horizontal section, requiring that the stem next be rotated, and another vertical section, requiring that the stem next be withdrawn axially from the housing.

3. A pressure relief valve as defined in claim 2, wherein the means for preventing inadvertent removal of the stem from the housing further includes:
   means attached to the valve stem, for engaging a portion of the valve housing to restrict axial movement of the stem with respect to the housing;
   wherein the means attached to the valve stem is manually movable to overcome the restriction in axial movement of the stem.

4. A pressure relief valve as defined in claim 3, wherein:
   the means attached to the valve stem is part of an operating handle and includes at least one bendable tab for engaging a flange on the valve body, wherein the bendable tab my be positioned to disengage from the flange and permit axial removal of the stem from the housing.

5. A pressure relief valve comprising:
   a valve housing with an inlet port connected to a pressure vessel, an outlet port for venting fluid from the pressure vessel, and a valve seat;
   a valve stem, having a seal for engaging the valve seat in a closed position;
   means for opening and closing the valve completely in less that a full turn of the valve stem, including at least one pin on the valve stem cooperating with a camming slot in the valve housing; wherein the camming slot includes a steeply sloping portion to effect rapid opening and closing of the valve, and detent means in the form of a portion of different slope at each end of the steeply sloping portion, to retain the stem in a selected open or closed position;
   constriction means extending into a portion of the camming slot for preventing inadvertent removal of the valve stem from the valve housing whereby a requisite force is required in a specific direction to remove the valve stem from the valve housing;
   whereby the pressure vessel can be vented reliably without risk of losing a valve component; and
   means for attaching a pressure gauge to the valve.

6. A manual air pressure relief valve for installation on a swimming pool filter tank, the relief valve comprising:
   a valve housing with an inlet port connectable to a filter tank subject to pressurization, an outlet port for venting compressed air from the tank, and a valve seat near the inlet port;
   a valve stem, sized to fit operatively in the housing having a seal for engaging the valve seat in a closed position of the valve;
   mechanical means for converting rotational motion of the stem into axial motion, for opening and closing the valve, such that complete opening from a closed position is achieved in approximately one quarter-turn of the valve stem, wherein the mechanical means includes two pins on the valve stem and two irregularly shaped slots in the valve housing, in which the pins engage, wherein the slots each include a steeply sloping portion to effect rapid opening and closing of the valve, and detent means at each end of the steeply sloping portion, to retain the stem in a selected open or closed position, and wherein the detent means includes a slot portion of different slope from the steeply sloping portion; and
   means for preventing inadvertent removal of the valve stem from the valve housing;
   whereby the filter tank can be vented safely and reliably without risk of losing a valve component;
   and wherein the means for preventing inadvertent removal of the valve stem from the valve housing includes an extended portion of each slot, which can only be reached by applying a requisite force to the stem in specific direction, wherein the extended portion of the slot is separated from the steeply sloping portion by a constriction in the slot width.

7. An air pressure relief valve as defined in claim 6, wherein:
   the extended portion of the slot includes a vertical section, requiring that the stem be further inserted axially into the housing, a subsequent horizontal section, requiring that the stem next be rotated, and another vertical section, requiring that the stem next be withdrawn axially from the housing.

8. An air pressure relief valve as defined in claim 6, wherein the means for preventing inadvertent removal of the stem from the housing further includes:

valve handle means attached to the valve stem, and including a manually bendable portion for engaging a portion of the valve housing to restrict axial movement of the stem with respect to the housing;

wherein the bendable portion is manually movable to overcome the restriction in axial movement of the stem.

9. An air pressure relief valve as defined in claim 8, wherein:

the handle means includes a generally cylindrical cover and the bendable portion is a portion of the cylindrical wall of the cover.

10. A manual air pressure relief valve for installation on a swimming pool filter tank, the relief valve comprising:

a valve housing with an inlet port connectable to a filter tank subject to pressurization, an outlet port for venting compressed air from the tank, and a valve seat near the inlet port:

a valve stem, sized to fit operatively in the housing having a seal for engaging the valve seat in a closed position of the valve;

mechanical means for converting rotational motion of the stem into axial motion, for opening and closing the valve, such that complete opening from a closed position is achieved in approximately one quarter-turn of the valve stem, wherein the mechanical means includes two pins on the valve stem and two irregularly shaped slots in the valve housing, in which the pins engage, wherein the slots each include a steeply sloping portion to effect rapid opening and closing of the valve, and detent means at each end of the steeply sloping portion, to retain the stem in a selected open or closed position, and wherein the detent means includes a slot portion of different slope from the steeply sloping portion; and constriction means extending into at least one of the irregularly shaped slots for preventing inadvertent removal of the valve stem from the valve housing whereby a requisite force is required in a specific direction to remove the valve stem from the valve housing;

whereby the filter tank can be vented safely and reliably without risk of losing a valve component;

wherein the stem has a generally axial passage extending through it;

and wherein the axial passage includes a threaded portion for attaching a pressure gauge, to obtain a reading of pressure in the filter tank.

* * * * *

UNITED STATES PATENT AND TRADEMARK OFFICE
CERTIFICATE OF CORRECTION

PATENT NO. : 5,435,339
DATED : July 25, 1995
INVENTOR(S) : Joseph E. Hayes

It is certified that error appears in the above-indentified patent and that said Letters Patent is hereby corrected as shown below:

In column 4, line 22 change "them" to --there--.
In column 5, line 40 replace "an" with --an--.
In column 5, line 36 replace ":" with --;--.
In column 7, line 24 replace ":" with --;--.

Signed and Sealed this

Twelfth Day of November, 1996

Attest:

BRUCE LEHMAN

Attesting Officer    Commissioner of Patents and Trademarks